US012635018B2

(12) United States Patent (10) Patent No.: US 12,635,018 B2

Hong et al. (45) Date of Patent: May 19, 2026

(54) WIRELESS COMMUNICATION METHOD AND APPARATUS, AND STORAGE MEDIUM

(71) Applicant: BEIJING XIAOMI MOBILE SOFTWARE CO., LTD., Beijing (CN)

(72) Inventors: Wei Hong, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 386 days.

(21) Appl. No.: 18/013,647

(22) PCT Filed: Jul. 27, 2020

(86) PCT No.: PCT/CN2020/104921

§ 371 (c)(1),
(2) Date: Dec. 29, 2022

(87) PCT Pub. No.: WO2022/021016

PCT Pub. Date: Feb. 3, 2022

(65) Prior Publication Data

US 2023/0300928 A1 Sep. 21, 2023

(51) Int. Cl.
H04W 76/16 (2018.01)

(52) U.S. Cl.
CPC ................................... H04W 76/16 (2018.02)

(58) Field of Classification Search
CPC .................................................. H04W 76/16
USPC ......................................................... 370/329
See application file for complete search history.

(56) References Cited

U.S. PATENT DOCUMENTS

| | | | | |
|---|---|---|---|---|
| 2014/0314048 A1* | 10/2014 | Yi | ........................... | H04W 4/70 |
| | | | | 370/332 |
| 2015/0117413 A1* | 4/2015 | Feder | .................. | H04W 36/185 |
| | | | | 370/331 |
| 2017/0331529 A1* | 11/2017 | Lee | ....................... | H04B 7/0689 |
| 2017/0353283 A1* | 12/2017 | Hsu | ....................... | H04B 7/0452 |
| 2018/0262905 A1* | 9/2018 | Dhanapal | ................ | H04W 8/24 |
| 2018/0343608 A1* | 11/2018 | Duan | .................... | H04W 48/16 |
| 2019/0132851 A1* | 5/2019 | Davydov | ........... | H04W 72/541 |
| 2020/0068640 A1 | 2/2020 | Hong | | |
| 2020/0076537 A1* | 3/2020 | Sun | ........................ | H04J 11/005 |
| 2021/0136665 A1* | 5/2021 | Wu | ........................ | H04W 8/24 |

(Continued)

FOREIGN PATENT DOCUMENTS

| | | |
|---|---|---|
| CN | 104717632 A | 6/2015 |
| CN | 108702702 A | 10/2018 |
| WO | WO 2019197036 A1 | 10/2019 |

OTHER PUBLICATIONS

Chinese Patent Application No. 202080001683.6, Office Action dated Oct. 13, 2023, 10 pages.

(Continued)

*Primary Examiner* — Faisal Choudhury
(74) *Attorney, Agent, or Firm* — Cozen O'Connor

(57) ABSTRACT

A wireless communication method includes: obtaining, by a user equipment, target information from at least one base station; determining, by the user equipment based on the target information, a multi-modal type supported by the at least one base station corresponding to the target information; and determining, by the user equipment based on the multi-modal type supported by the at least one base station, a target base station to be accessed.

9 Claims, 7 Drawing Sheets

(56)     References Cited

U.S. PATENT DOCUMENTS

2021/0351816 A1* 11/2021 Raghavan ............. H04L 5/0023
2023/0362808 A1* 11/2023 Onaka ............... H04W 72/0446

OTHER PUBLICATIONS

Chinese Patent Application No. 202080001683.6, English translation of Office Action dated Oct. 13, 2023, 17 pages.
European Patent Application No. 20946689.5, Search and Opinion dated Mar. 18, 2024, 11 pages.
Indian Patent Application No. 202347006517, Office Action dated Mar. 18, 2024, 6 pages.
PCT/CN2020/104921, English translation of International Search Report dated Apr. 25, 2021, 2 pages.

* cited by examiner

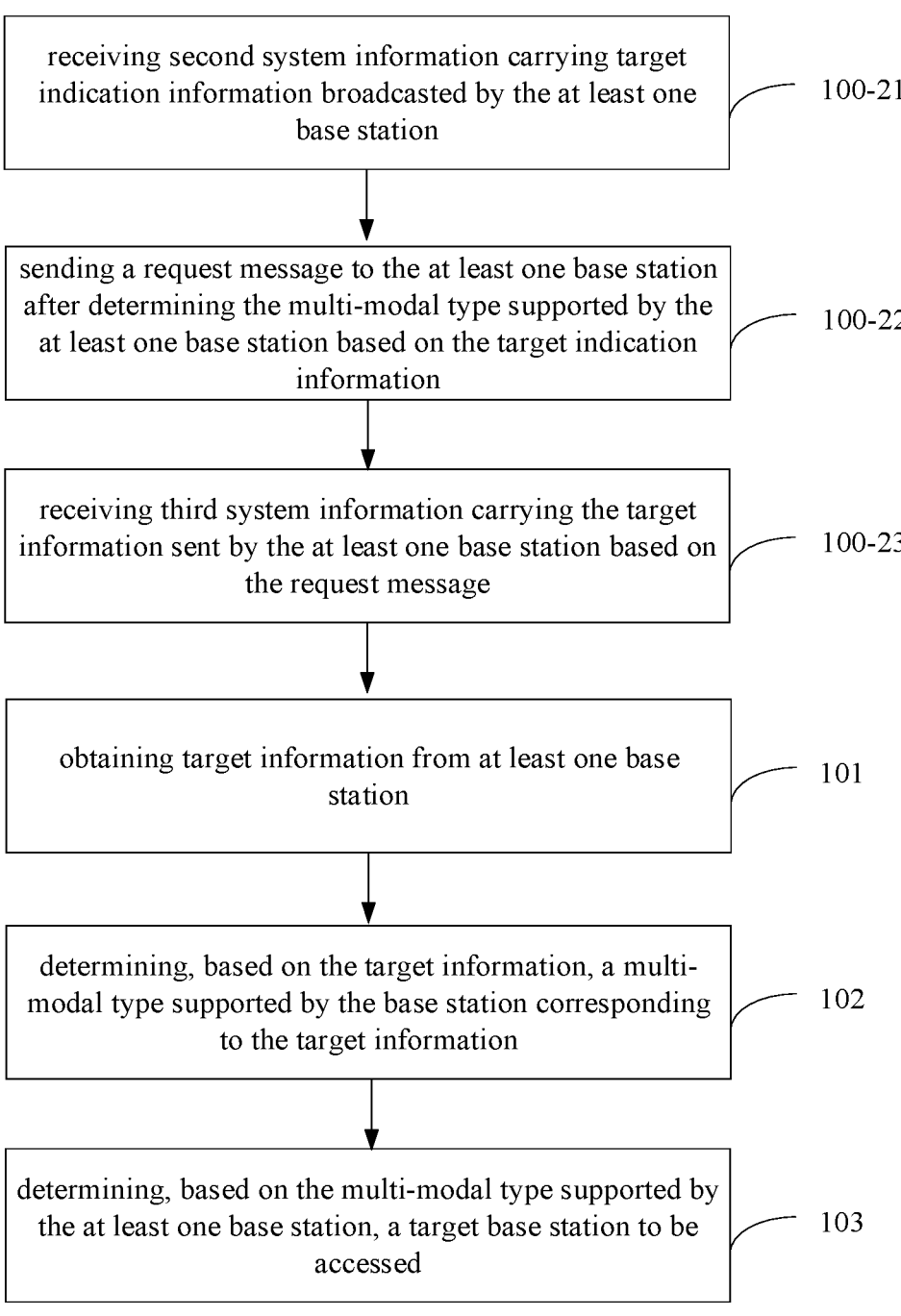

receiving second system information carrying target indication information broadcasted by the at least one base station — 100-21 sending a request message to the at least one base station after determining the multi-modal type supported by the at least one base station based on the target indication information — 100-22 receiving third system information carrying the target information sent by the at least one base station based on the request message — 100-23 obtaining target information from at least one base station — 101 determining, based on the target information, a multi-modal type supported by the base station corresponding to the target information — 102 determining, based on the multi-modal type supported by the at least one base station, a target base station to be accessed — 103

FIG. 3 determining, based on a target correspondence between the multi-modal type and the target identification information, the target identification information corresponding to the multi-modal type supported by the base station ⟍ 200-2 sending target system information carrying target information to at least one user equipment ⟍ 201 broadcasting the target correspondence configured by the base station to the at least one user equipment ⟍ 202

FIG. 7

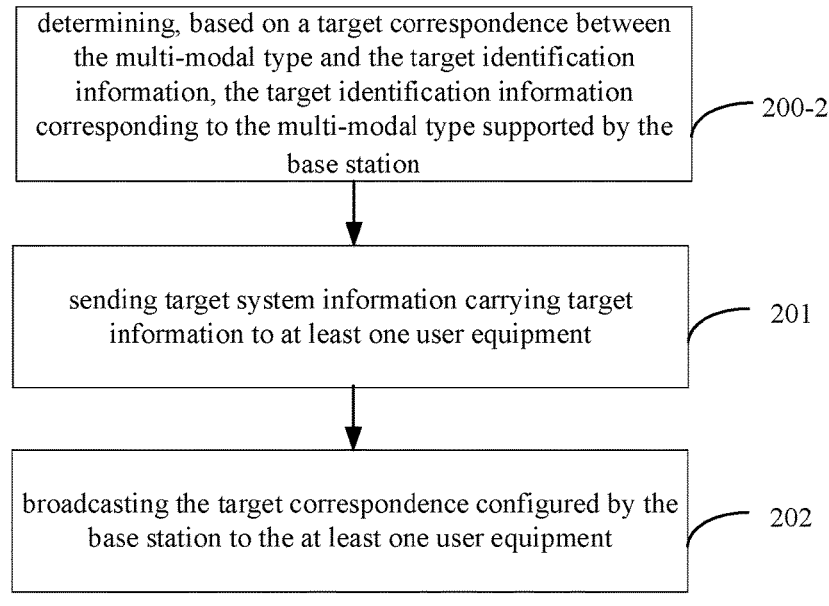

| Base station 1 | User equipment | Base station 2 |
|---|---|---| step 301: at least one base station broadcasting second system information carrying target indication information step 301: at least one base station broadcasting second system information carrying target indication information Step 302: the UE sending a request message to the at least one base station after determining the multi-modal type supported by the at least one base station based on the target indication information Step 302: the UE sending a request message to the at least one base station after determining the multi-modal type supported by the at least one base station based on the target indication information Step 303: the at least one base station sending third system information carrying the target information to the user equipment based on the request message Step 303: the at least one base station sending third system information carrying the target information to the user equipment based on the request message step 304: the UE selecting from the at least one base stations base stations with target parameter values greater than a preset threshold value as first candidate base stations step 305: the UE determining a target base station to be accessed from the first candidate base stations based on the multimodal types supported by the first candidate base stations and a second preset setting

FIG. 8 wireless communication apparatus obtaining module ⌐410 first determining module ⌐420 second determining module ⌐430 wireless communication apparatus sending module ⌐510

WIRELESS COMMUNICATION METHOD AND APPARATUS, AND STORAGE MEDIUM

CROSS-REFERENCE TO RELATED APPLICATION

This application is a U.S. national phase of International Application No. PCT/CN2020/104921, filed with the State Intellectual Property Office of P. R. China on Jul. 27, 2020, the content of which is incorporated herein by reference in its entireties.

TECHNICAL FIELD

The disclosure relates to the communication field, and more particularly, it relates to a wireless communication method, a wireless communication apparatus and a storage medium.

BACKGROUND

Smart interaction is an important application scenario for mobile communications. The smart interaction is an intelligent interaction generated between the intelligent entities (including people and objects). Most of the existing interactions between the intelligent entities are passive and depend on demanded inputs, such as voice and visual interactions between humans and smart home devices, and the inputs are unimodal.

Currently, cellular networks do not support a multimodal functionality, and the user equipment does not consider multimodal-related contents when selecting a base station to access.

SUMMARY

To overcome the problems in the related art, the embodiments of the disclosure provide a wireless communication method, a wireless communication apparatus and a storage medium.

According to a first aspect of the disclosure, a wireless communication method, applied in a user equipment, is provided. The method includes:

obtaining target information from at least one base station;

determining, based on the target information, a multi-modal type supported by the base station corresponding to the target information; and determining, based on the multi-modal type supported by the at least one base station, a target base station to be accessed.

According to a second aspect of the disclosure, a wireless communication method, applied in a base station, is provided. The method includes:

sending target system information carrying target information to at least one user equipment, in which the target information is associated with a multi-modal type supported by the base station.

According to a third aspect of the disclosure, a non-transitory computer readable storage medium storing computer programs is provided. The computer programs are configured to implement the wireless communication method described in any one of the embodiments of the disclosure of the second aspect.

According to a fourth aspect of the disclosure, a wireless communication device is provided. The wireless communication device includes:

a processor;

a memory for storing computer programs; in which the processor is configured to execute the computer programs to implement the wireless communication method of any one of the embodiments of the disclosure of the first aspect.

According to a fifth aspect of the disclosure, a wireless communication device is provided. The wireless communication device includes:

a processor;

a memory for storing computer programs; in which the processor is configured to execute the computer programs to implement the wireless communication method of any one of the embodiments of the disclosure of the second aspect.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 3 is a flowchart of a wireless communication method according to an exemplary embodiment.

FIG. 7 is a flowchart of a wireless communication method according to an exemplary embodiment.

FIG. 8 is a flowchart of a wireless communication method according to an exemplary embodiment.

DETAILED DESCRIPTION

Figures 1, 2:
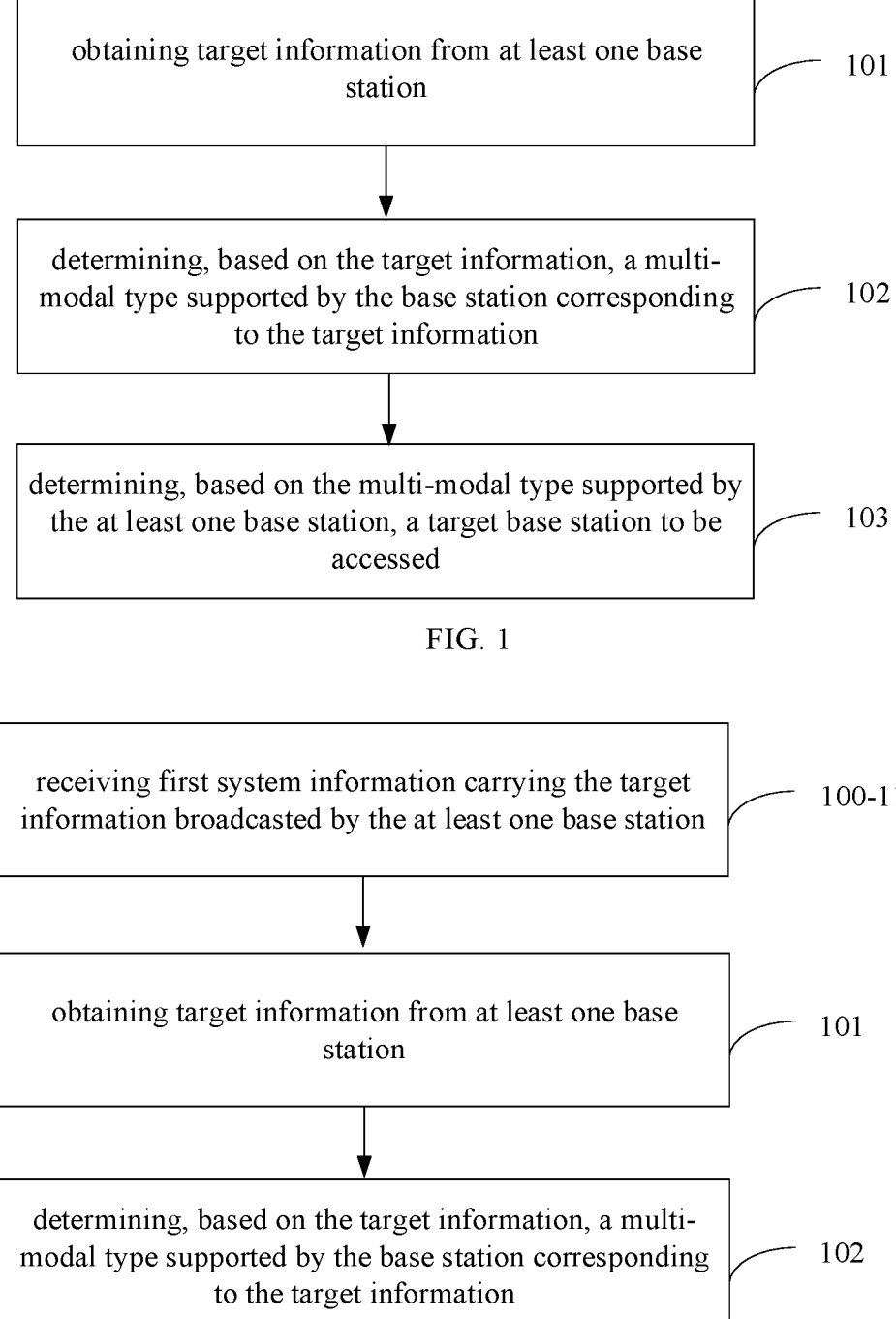
FIG. 1 is a flowchart of a wireless communication method according to an exemplary embodiment.
FIG. 2 is a flowchart of a wireless communication method according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

According to embodiments of the disclosure, a wireless communication method, applied in a user equipment, is provided. The method includes: obtaining, by a user equipment, target information from at least one base station; determining, by the user equipment based on the target information, a multi-modal type supported by the at least one base station corresponding to the target information; and determining, by the user equipment based on the multi-modal type supported by the at least one base station, a target base station to be accessed.

Optionally, the method further includes: receiving first system information broadcasted by the at least one base station, in which the first system information carries the target information.

Optionally, the method further includes: receiving second system information carrying target indication information broadcasted by the at least one base station; sending a request message to the at least one base station after determining the multi-modal type supported by the at least one base station based on the target indication information, in which the request message is configured to request for the multi-modal type supported by the at least one base station; and receiving third system information sent by the at least one base station based on the request message, in which the third system information carries the target information and is sent by the at least one base station via a unicast signaling or is broadcasted to the user equipment.

Optionally, the target information includes target type information for indicating at least one multi-modal type supported by the at least one base station corresponding to the target information; or, the target information includes target identification information corresponding to the multi-modal type supported by the at least one base station corresponding to the target information.

Optionally, determining, based on the target information, the multi-modal type supported by the at least one base station corresponding to the target information, includes: in response to the target information including the target identification information, determining, based on a target correspondence between the at least one multi-modal type and the target identification information, the multi-modal type supported by the at least one base station corresponding to the target information.

Optionally, the method further includes at least one of: receiving the target correspondence configured by the at least one base station and broadcasted by the at least one base station; receiving the target correspondence configured by a core network; or determining the target correspondence based on a first preset setting.

Optionally, the method further includes: in response to obtaining the target information from a plurality of base stations, determining the target base station to be accessed based on the multi-modal type supported by the plurality of base stations and a second preset setting.

Optionally, the second preset setting includes: a matching degree between the multi-modal type supported by the plurality of base stations and a multi-modal type supported by the user equipment.

According to embodiments of the disclosure, a wireless communication method, applied in a base station, is provided. The method includes: sending, by a base station, target system information carrying target information to at least one user equipment, in which the target information is associated with a multi-modal type supported by the base station.

Optionally, the target system information is first system information, in which the first system information is broadcasted by the base station to the at least one user equipment; or the target system information is third system information, in which the third system information is sent by the base station via a unicast signaling or is broadcasted to the at least one user equipment in response to a request message from the at least one user equipment, and the request message is configured to request for the multi-modal type supported by the base station.

Optionally, the method further includes: in response to the target system information being the third system information, broadcasting second system information carrying target indication information to the at least one user equipment before sending the target system information carrying the target information to the at least one user equipment, in which the target indication information is configured to indicate the multi-modal type supported by the base station.

Optionally, the target information includes target type information for indicating at least one multi-modal type supported by the base station; or, the target information includes target identification information corresponding to the at least one multi-modal type supported by the base station.

Optionally, the method further includes: determining, based on a target correspondence between the multi-modal type and the target identification information, the target identification information corresponding to the multi-modal type supported by the base station.

Optionally, the method further includes at least one of: configuring the target correspondence by the base station; receiving the target correspondence configured by a core network; or determining the target correspondence based on a first preset setting.

Optionally, the method further includes: broadcasting the target correspondence configured by the base station to the at least one user equipment.

The technical solution provided by the embodiments of the disclosure may include the following beneficial effects.

In the embodiments of the disclosure, the user equipment may obtain the target information from the at least one base station, and may determine the multi-modal type supported by the base station corresponding to the target information based on the target information. The user equipment may further determine the target base station to be accessed based on the multi-modal type supported by the at least one base station. In the embodiments of the disclosure, the target base station to be accessed is determined based on the multimodal type supported by the at least one base station.

In the embodiment of the disclosure, the user equipment may receive the first system information carrying the target information broadcasted by the at least one base station, and the multimodal type supported by the base station corresponding to the first system information is determined based on the first system information. Alternatively, the user equipment may receive the second system information broadcasted by the at least one base station. After determining the multimodal type supported by the at least one base station based on the target indication information carried in the second system information, the user equipment sends the request message to the at least one base station to request for the multi-modal type supported by the at least one base station, then the user equipment may receive the third system information carrying the target information sent by the at least one base station based on the request message. Certainly, the third system information may be sent by the at least one base station via the unicast signaling or is broadcasted to the user equipment. Therefore, the target information is obtained from the at least one base station, and the user equipment may select a suitable target base station for access based on the multimodal type supported by the at least one base station, and thus high availability is achieved.

In the embodiment, the target information sent by the base station may include the target type information for indicating the multi-modal type supported by the base station corresponding to the target information, and the user equipment may directly determine the multimodal type supported by the base station based on the target type information. Alternatively, the target information sent by the base station may include the target identification information corresponding to the multi-modal type supported by the base station corresponding to the target information, and the user equipment determines the multimodal type supported by the base station corresponding to the received target identification information based on the target correspondence between the multi-modal type and the target identification information, which is easy to implement and has a high usability.

In the embodiment of the disclosure, the target correspondence can be configured by the base station and/or can be configured by the core network. After receiving the target correspondence sent by the base station and/or the core network, the user equipment may determine the multimodal type supported by the base station based on the received target identification information. The target correspondence can also be determined based on the first preset setting, which is easy to implement and has the high usability.

In the embodiment of the disclosure, the user equipment can also select the target base station to be accessed based on the multimodal type supported by the plurality of base stations and the matching degree between the multimodal type supported by the plurality of base stations and the multimodal type supported by the user equipment, to realize the high usability.

Before introducing the wireless communication method provided by the embodiments of the disclosure, multimodality is introduced at first.

In the future 6G communication, multimodality will be an important communication mode. Multimodality refers to sending inputs from multiple devices or inputs from one device to a centralized processing device to synthesize the inputs, to obtain one or more outputs satisfying the user's requirements. The multiple outputs may also be output by the multiple devices or be output by the one device.

For example, when conducting a video conference with multiple participants, the video contents of the multiple participants are captured by cameras, and the audio contents of the multiple participants are collected by microphones, the multimodality means that the video contents and the audio contents captured can be used as multiple inputs and sent to the centralized processing device. The centralized processing device may include, but is not limited to, a cloud platform. The cloud platform provides multiple outputs after an integrated processing, including but not limited to text content outputs synchronized with the video inputs and the audio inputs, personnel identity information outputs, and video content outputs.

For example, in a smart home system, if the user wants to control one of the smart home devices, the user needs to send a control instruction by a terminal bound to that smart home device or trigger the physical buttons on that smart home device according to the existing implementation mode. In this scenario, multimodality means that an action video stream of the user captured by the cameras in the smart home system and audio contents of the user collected by the microphones are sent to a corresponding centralized processing device of the smart home system as multiple inputs, and the centralized processing device can determine the smart home device to be controlled and the corresponding control instruction by analyzing mouth movements and gestures of the user appearing in the action video stream and audio input contents, and control the smart home device to perform the corresponding operation according to the control instruction.

The above is only an exemplary illustration, and in an actual application, the multimodality can be applied in different scenarios.

Currently, when the user equipment selects or reselects a cell, it selects suitable base stations for access based on signal qualities of the base stations, without considering the multimodal type supported by the base stations and the multimodal type supported by the user equipment. When the user equipment is connected to the base station, the multimodal type supported by the base station may not match the multimodal type supported by the user equipment, then it is difficult to quickly implement the service to be executed by the user equipment.

To address the above issues, the disclosure provides the following wireless communication scheme to select a suitable target base station for access based on the multimodal type supported by the base station and the multimodal type supported by the user equipment. It should be noted that in the embodiments of the disclosure, the multimodal type supported by the base station or the multimodal type supported by the user equipment may be, but are not limited to, classified based on the service type or the input mode.

In an example, the multimodal type can be classified based on the service type, which includes, but is not limited to, a cloud conference type, a remote control access type, a face recognition type, and an image analysis type.

In another example, the multimodal type can be classified based on the input mode, which includes, but is not limited to, a combination of any one or more of the following: a video input type, an audio input type, a fingerprint input type, a voiceprint input type, an eyeprint input type, and a voice tone input type.

The following is a description of a wireless communication method, applied in a user equipment side provided by the disclosure. The embodiments of the disclosure provide a wireless communication method, applied in a user equipment that supports multimodality. The method may include the following steps.

At step 101, target information from at least one base station is obtained.

In the embodiment of the disclosure, the target information is associated with the multi-modal type supported by the base station.

At step 102, a multi-modal type supported by the base station corresponding to the target information is determined based on the target information.

At step 103, a target base station to be accessed is determined based on the multi-modal type supported by the at least one base station.

In the embodiment of the disclosure, after determining the target base station to be accessed, the user equipment may directly access the target base station or may temporarily reside in the target base station and access the target base station when there is data to be transmitted subsequently, which is not limited in the disclosure.

In the above embodiment, the user equipment may obtain the target information from the at least one base station, and determine the multi-modal type supported by the base station corresponding to the target information based on the target information. The user equipment may determine the target base station to be accessed based on the multi-modal type supported by the at least one base station. In the embodiments of the disclosure, the target base station to be accessed is determined based on the multi-modal type supported by the at least one base station.

In an optional embodiment, FIG. 2 is a flowchart of another wireless communication method on the basis of the embodiment shown in FIG. 1. As shown in FIG. 2, the method may further include the following steps.

At step 100-11, first system information carrying the target information broadcasted by the at least one base station is received.

In the embodiment of the disclosure, the user equipment may receive the first system information carrying the target information broadcasted by the at least one base station.

The first system information may include minimum System Information (SI) or other SI. The minimum SI is the minimum SI required for the terminal to access the base station, and other SI is SI other than the minimum SI.

The base station periodically broadcasts the first SI carrying the target information, so that the user equipment can obtain the target information based on the received first SI.

In an optional embodiment, FIG. 3 is a flowchart of another wireless communication method on the basis of the embodiment shown in FIG. 1. As shown in FIG. 3, the method may further include the following steps.

At step 100-21, second SI carrying target indication information broadcasted by the at least one base station is received.

In the embodiment of the disclosure, the second SI may include the minimum SI or the other SI. The at least one base station may periodically broadcast the second SI carrying the target indication information. The target indication information may indicate whether the corresponding base station supports multimodality.

At step 100-22, a request message is sent to the at least one base station after determining the multi-modal type supported by the at least one base station based on the target indication information.

The request message is configured to request for the multi-modal type supported by the at least one base station. Optionally, the request message may be a request message requesting for the other SI.

At step 100-23, third system information carrying the target information sent by the at least one base station is received based on the request message.

In the embodiment of the disclosure, the base station may send the target information to the user equipment via the third SI. In the case where the user equipment initiates the request message requesting for the other SI, correspondingly, the third SI sent by the base station is the other SI.

The base station may send the third SI to the user equipment by periodically broadcasting, or the base station may send the third SI to the user equipment via the unicast signaling.

After receiving the third SI, the user equipment may perform step 101 to determine the target information from the at least one base station.

In the above embodiment, the target information is obtained from the at least one base station, and the user equipment may determine the target base station to be accessed based on the multimodal type supported by the at least one base station, and thus the high availability is achieved.

In an optional embodiment, the target information may include target type information for indicating the multi-modal type supported by the base station corresponding to the target information. For example, if the multi-modal type supported by the base station includes type A, type B and type C, then the target type information includes type A, type B and type C.

For step 102, the user equipment may determine the multi-modal type supported by the base station directly based on the target type information.

Alternatively, considering that when the target information including the target type information is sent to the user equipment, many bits are occupied due to the large contents of the target type information, and thus in order to reduce the resource occupation, the target information may include the target identification information corresponding to the multimodal type supported by the base station corresponding to the target information. The target identification information may be represented by a string or an integer value.

For example, the multi-modal type supported by the base station includes type A, type B and type C. The target identification information may be a string corresponding to all the three types, which may be represented as abc. Alternatively, the target identification information may be a value corresponding to all the three types, which may be represented as a binary value 111.

In the case where the target information sent by the base station includes the target identification information, for the above step 102, the terminal needs to determine the multimodal type supported by the base station based on the target identification information after conversion.

Step 102 may include:

in response to the target information including the target identification information, determining, based on a target correspondence between the multi-modal type and the target identification information, the multi-modal type supported by the base station corresponding to the target information.

In the embodiment, if the received target information sent by the base station includes the target identification information, the user equipment may determine the multi-modal type supported by the base station corresponding to the target identification information based on the target correspondence.

In an example, the target correspondence between the multi-modal type and the identification information may be configured by the base station. For example, the target correspondence configured by the base station is: the multimodal type including type A corresponds to a string a or a value 001, the multi-modal type including type B corresponds to a string b or a value 010, and so on. The base station may broadcast the configured target correspondence to the user equipment, and upon the reception of the target correspondence, the user equipment determines the multi-modal type supported by the base station corresponding to the target identification information based on the target correspondence and the received target identification information.

In another example, the target correspondence can be configured by the core network. After the user equipment receives the above target correspondence from the core network, the user equipment determines the multi-modal type supported by the base station corresponding to the target identification information based on the target correspondence and the received target identification information.

In another example, the target correspondence may be determined according to a first preset setting. The first preset setting may be but is not limited to those specified in a protocol. After the target correspondence is determined according to the protocol, the user equipment determines the multi-modal type supported by the base station corresponding to the target identification information based on the target correspondence and the received target identification information.

In the above embodiments, the target correspondence may be configured by the base station and/or the core network, and upon the reception of the target correspondence sent by the base station and/or the core network, the user equipment determines the multi-modal type supported by the base station based on the received target identification information. The target correspondence may be determined based on the first preset setting, which is easy to implement and has the high usability.

Figure 4:
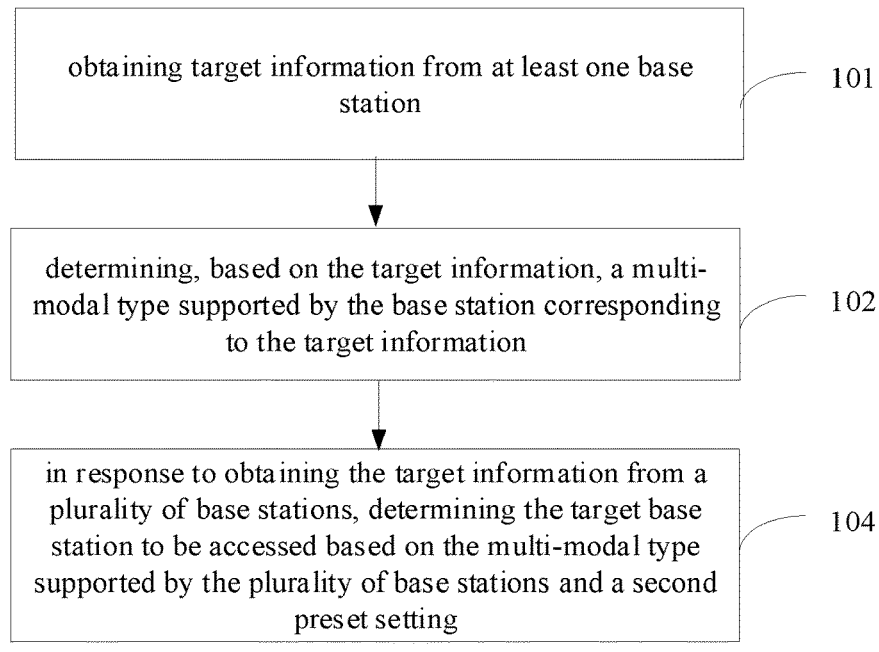
FIG. 4 is a flowchart of a wireless communication method according to an exemplary embodiment.

In an optional embodiment, FIG. 4 is a flowchart of another wireless communication method on the basis of the embodiment shown in FIG. 1. As shown in FIG. 4, the method may further include the following steps.

At step 104, in response to obtaining the target information from a plurality of base stations, the target base station to be accessed is determined based on the multi-modal type supported by the plurality of base stations and a second preset setting.

In the embodiment of the disclosure, the second preset setting includes, but is not limited to, a matching degree between the multi-modal type supported by the plurality of base stations and the multi-modal type supported by the user equipment.

In one example, a plurality of first candidate base stations with a better signal quality are selected based on the signal qualities of the plurality of base stations measured by the user equipment, and then the target base station to be accessed is determined based on the multi-modal type supported by the plurality of first candidate base stations and the second preset setting.

In the embodiments of the disclosure, a plurality of base stations with a target parameter value greater than a preset threshold value are selected from the plurality of base stations as candidate base stations. The target parameter value is a parameter value used to measure the signal quality of the base station, which includes but is not limited to a value of Reference Signal Receiving Power (RSRP) corresponding to the base station.

In another example, at least one second candidate base station may be selected from the plurality of base stations. The multi-modal type supported by the at least one second candidate base station includes the multi-modal type supported by the user equipment.

For example, the multi-modal type supported by the user equipment includes type A and type B, and the plurality of base stations include base station 1, base station 2 and base station 3. If base station 1 supports type A, type B and type C, base station 2 supports type B and type D, and base station 3 supports type A and type F, then base station 1 is determined to be the second candidate base station.

If there is only one second candidate base station, then the second candidate base station is directly determined as the target base station to be accessed.

If there are multiple second candidate base stations, then the multi-modal types supported by the multiple second candidate base stations may be scored, and the second candidate base station with the highest score is determined as the target base station. Scoring the multi-modal types supported by the multiple second candidate base stations includes, but is not limited to, averaging weight values of the multi-modal types supported by the second candidate base stations to obtain corresponding scores.

For example, the multi-modal type supported by the user equipment includes type A and type B, and the plurality of base stations include base station 1, base station 2 and base station 3. If base station 1 supports type A, type B and type C, base station 2 supports type B and type D, and base station 3 supports type A, type B, type D and type E, then both base station 1 and base station 2 can be used as the second candidate base stations.

Assuming that type A corresponds to a weight value m1, type B corresponds to a weight value m2, type C corresponds to a weight value m3, type D corresponds to a weight value m4, and type E corresponds to a weight value m5, then the score of base station 1 is determined by $d1=(m1+m2+m3)/3$, and the score of base station 3 is determined by $d2=(m1+m2+m4+m5)/4$. If $d1<d2$, then base station 3 can be used as the target base station.

In an example, the first candidate base stations with a better signal quality may also be selected from the plurality of base stations, and the second candidate base station may be determined from the first candidate base stations, and then the target base station may be determined finally. The determining process is the same as the above example of determining the target base station based on the second candidate base station, which is not repeated here.

In the above embodiments, the user equipment can also select the target base station to be accessed based on the multi-modal type supported by the plurality of base stations and the matching degree between the multi-modal type supported by the plurality of base stations and the multi-modal type supported by the user equipment, which has the high availability.

The wireless communication method provided by the disclosure is described from the perspective of the base station side. The embodiments of the disclosure provide a wireless communication method, applied in a base station. The method includes the following steps.

At step 201, target SI carrying target information is sent to at least one user equipment.

In the embodiment of the disclosure, the target SI carries the target information. In the above embodiment, the base station may send the target SI carrying the target information to the at least one user equipment. The target information is associated with the multi-modal type supported by the base station. After the target information is obtained from the at least one base station, the user equipment determines the multi-modal mode supported by the at least one base station based on the target information, and determines the target base station to be accessed. Therefore, the target base station to be accessed is determined based on the multi-modal type supported by the at least one base station.

For step 201 above, in an example, the target SI is the first SI. The first SI broadcasted by the base station to the at least one user equipment may include the minimum SI or the other SI.

The base station may broadcast the first SI carrying the target information to the user equipment with a preset period.

In another example, the target SI is the third SI. The third SI is sent by the base station via the unicast signaling or broadcasted to the at least one user equipment by the base station in response to the request message from the at least one user equipment, and the request message is configured to request for the multi-modal type supported by the base station.

In the embodiment of the disclosure, the base station may receive the request message from the at least one user equipment, and the request message is configured to request for the multi-modal type supported by the base station. The request message may be a request message for requesting the other SI.

The base station, upon sending the target information to the user equipment, may send the third SI carrying the target information to the user equipment that initiates the request via the unicast signaling based on the request message.

Alternatively, after the above request message from the user equipment is received, the base station may broadcast the third SI carrying the target information to the at least one user equipment based on the request message.

If the user equipment initiates the request message requesting for the other SI, correspondingly, the second SI sent by the base station is the other SI carrying the target information.

In the above embodiment, the base station may broadcast the first SI carrying the target information to the user equipment. Alternatively, the base station may send the third SI carrying the target information to the user equipment via the unicast signaling based on the request message sent by the at least one user equipment. Alternatively, the base station may also broadcast the third SI carrying the target information based on the request message sent by the at least one user equipment. Therefore, after sending the SI carrying the target information to the user equipment, the user equipment determines the target base station to be accessed based on the multi-modal type supported by the at least one base station.

Figure 5:
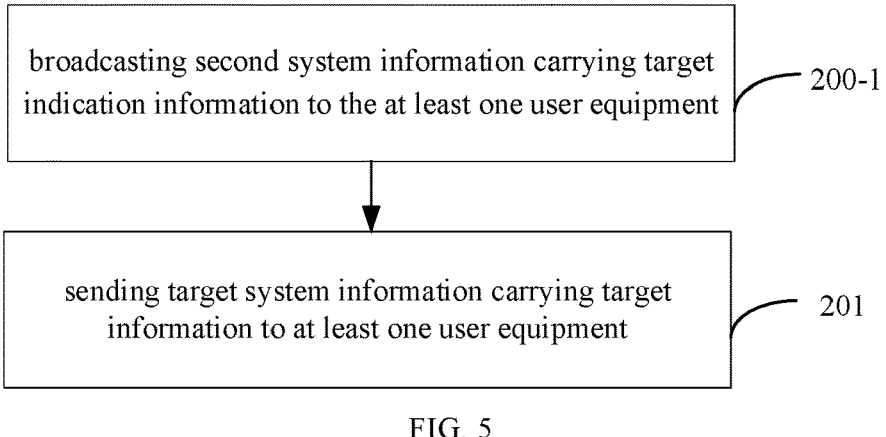
FIG. 5 is a flowchart of another wireless communication method according to an exemplary embodiment.

In an optional embodiment, FIG. 5 is a flowchart of another wireless communication method according to an exemplary embodiment. As shown in FIG. 5, the method may further includes the following steps.

At step 200-1, second SI carrying target indication information is broadcasted to the at least one user equipment.

If the target SI is the third SI, step 200-1 may be performed before performing step 401 above to broadcast the second SI carrying the target indication information to the at least one user equipment. The second SI may be the minimum SI or the other SI. The target indication information is configured to indicate the multi-modal type supported by the base station.

After receiving the second SI, the user equipment may send a request message requesting for the target information after determines the base station supports the multi-modal type based on the target indication information. The base station sends the third SI carrying the target information to the user equipment based on the request message.

In the above embodiment, the base station may broadcast the second SI carrying the target indication information to the at least one user equipment, so that after the user equipment determines the base station supports the multi-modal type, it sends the request message requesting for the target information, which has the high availability.

In an optional embodiment, the target information includes the target type information for indicating the multi-modal type supported by the base station; or, the target information includes the target identification information corresponding to the multi-modal type supported by the base station.

Figure 6:
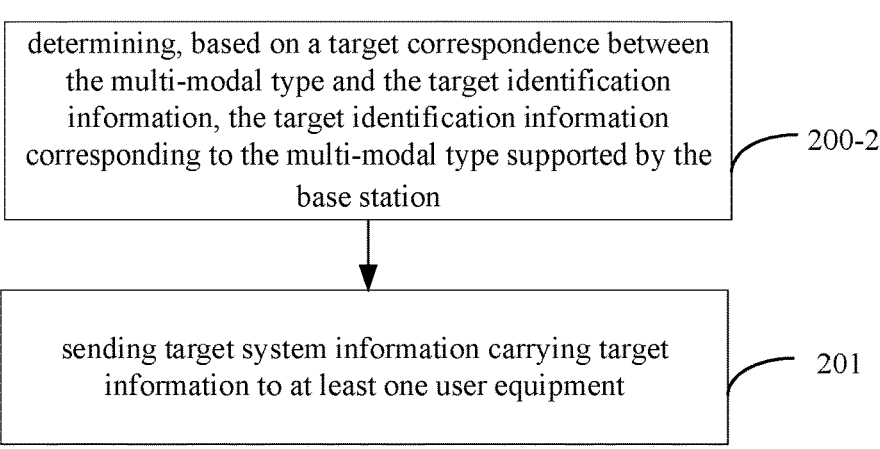
FIG. 6 is a flowchart of a wireless communication method according to an exemplary embodiment.

The target information includes the target identification information, as shown in FIG. 6, which is a flowchart of another wireless communication method according to an exemplary embodiment. As shown in FIG. 6, the method may include the following steps.

At step 200-2, based on a target correspondence between the multi-modal type and the target identification information, the target identification information corresponding to the multi-modal type supported by the base station is determined.

The target correspondence may be configured by the base station and/or the core network, and/or may be determined based on the first preset setting.

Based on the above target correspondence, the base station determines the target identification information corresponding to the multi-modal type supported by itself, and sends the target identification information to the at least one user equipment, thereby saving the signaling resources. The user equipment may also determine the multi-modal type supported by the base station based on the target correspondence and the received target identification information.

In the above embodiment, the target information may include the target type information or the target identification information. If the target information includes the target identification information, then the base station may determine the target identification information corresponding to the multi-modal type supported by itself based on the target correspondence between the multi-modal type and the target identification information, and send the target identification information to the user equipment, so that the user equipment may determine the multi-modal type supported by the base station, and then determine the target base station to be accessed based on the multi-modal type supported by the base station.

In an optional embodiment, the target correspondence is configured by the base station, as shown in FIG. 7, which is a flowchart of another wireless communication method on the basis of the embodiment shown in FIG. 6. As shown in FIG. 7, the method may further include the following steps.

At step 202, the target correspondence configured by the base station is broadcasted to the at least one user equipment.

In the embodiment, the base station may broadcast the target correspondence configured by itself by broadcasting a signaling. After receiving the signaling, the user equipment determines the multi-modal type supported by the base station based on the received target correspondence and the target identification information sent by the base station. Further, the target base station to be accessed is determined based on the multi-modal type supported by the base station.

In the embodiment of the disclosure, the order of execution of step 201 and step 202 is not limited. Step 201 may be executed before step 202, or step 202 may be executed before step 201.

In the above embodiment, the target correspondence is configured by the base station or configured by the core network. Alternatively, the target correspondence may also be determined based on the first preset setting. In the case that the base station configures the target correspondence, the base station may broadcast the target correspondence, so that the user equipment determines the multi-modal type supported by that base station based on the target correspondence, which is easy to implement and has the high availability.

In an optional embodiment, FIG. 8 is a flowchart of another wireless communication method according to an exemplary embodiment. In FIG. 8, only base station 1 and base station 2 are illustrated as examples, but in practice, there may be more base stations. As shown in FIG. 8, the method may further include the following steps.

At step 301, at least one base station broadcasts second SI carrying target indication information.

The target indication information is configured to indicate the multi-modal type supported by the base station, and the second SI may be either the minimum SI or the other SI.

At step 302, the UE sends a request message to the at least one base station after determining the multi-modal type supported by the at least one base station based on the target indication information.

The request message is configured to request for the multi-modal type supported by the at least one base station, and the request message is a request message requesting for the other SI.

At step 303, the at least one base station sends third system information carrying the target information to the UE based on the request message.

In the embodiment of the disclosure, the target information includes the target type information for indicating the multi-modal type supported by the base station corresponding to the target information. The base station may send the third SI carrying the target type information to the user device via the unicast signaling, or may periodically broadcast the third SI carrying the target type information. The third SI is the other SI.

At step 304, the UE selects from the at least one base stations base stations with target parameter values greater than a preset threshold value as first candidate base stations.

The target parameter value is a parameter value used to measure the signal quality of the base station.

At step 305, the UE determines a target base station to be accessed from the first candidate base stations based on the multimodal types supported by the first candidate base stations and a second preset setting.

In the embodiment of the disclosure, the user equipment may determine at least one second candidate base station based on the multi-modal types supported by the first candidate base stations and the second preset setting. The second candidate base station is determined in the same manner as provided in the above embodiments and will not be described herein.

If there is only one second candidate base station, the user equipment determines the second candidate base station as the target base station to be accessed.

If there are multiple second candidate base stations, the user equipment scores the second candidate base stations based on the multi-modal type supported by each of the second candidate base stations, and the second candidate base station with the highest score is determined as the target base station.

In an optional embodiment, the above steps 301 to 303 may be replaced with a step of sending the first SI carrying the target information to the user equipment by the at least one base station (not shown in FIG. 8), with other steps remaining unchanged.

The at least one base station may send the target information to the user equipment by periodically broadcasting the first SI carrying the target information, and the first SI may be the minimum SI or the other SI.

In the above embodiment, the user equipment may receive the target information sent by the at least one base station. The target information can be used for the user equipment to determine the multi-modal type supported by the base station corresponding to the target information. Further, the user equipment may determine the target base station to be accessed based on the multi-modal type supported by the base station and the multi-modal type supported by itself. In the embodiment, a suitable target base station can be selected for access based on the multi-modal type supported by the base station and the multi-modal type supported by the user device.

Corresponding to the wireless communication method of the above embodiments, the disclosure also provides a wireless communication apparatus.

Figures 9, 10:
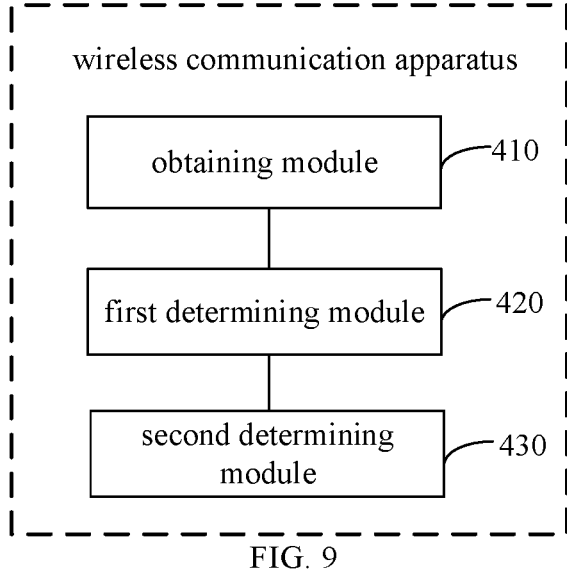
FIG. 9 is a block diagram of a wireless communication apparatus according to an exemplary embodiment.
FIG. 10 is a block diagram of another wireless communication apparatus according to an exemplary embodiment.

As shown in FIG. 9, FIG. 9 is a block diagram of a wireless communication apparatus according to an exemplary embodiment. The apparatus is applied in a user equipment, and the apparatus includes: an obtaining module 410, a first determining module 420 and a second determining module 430.

The obtaining module 410 is configured to obtain target information from at least one base station.

The first determining module 420 is configured to determine, based on the target information, a multi-modal type supported by the base station corresponding to the target information.

The second determining module 430 is configured to determine, based on the multi-modal type supported by the at least one base station, a target base station to be accessed.

As shown in FIG. 10, FIG. 10 is a block diagram of another wireless communication apparatus according to an exemplary embodiment. The apparatus is applied in a base station, and the apparatus includes: a sending module 610.

The sending module 610 is configured to send target system information carrying target information to at least one user equipment, in which the target information is associated with a multi-modal type supported by the base station.

The apparatus embodiments basically correspond to the method embodiments, the related contents can refer to part of the descriptions of the method embodiments. The above-described apparatus embodiments are merely schematic, the units described above as separate components may or may not be physically separated, and the components displayed as units may or may not be physical units, i.e., the components may be located in one area or may be distributed to multiple network units. Some or all of these modules can be selected according to practical needs to achieve the purpose of the solution of the disclosure. Those skilled in the art can understand and implement the solution without inventive works.

Correspondingly, the disclosure also provides a computer readable storage medium storing computer programs. The computer programs are configured to implement the wireless communication method applied in a user equipment side.

Correspondingly, the disclosure also provides a computer readable storage medium storing computer programs. The computer programs are configured to implement the wireless communication method applied in a base station side.

Correspondingly, the disclosure also provides a wireless communication device. The wireless communication device includes:

a processor;

a memory for storing computer programs; in which the processor is configured to execute the computer programs to implement the wireless communication method applied in a user equipment side.

Figure 11:
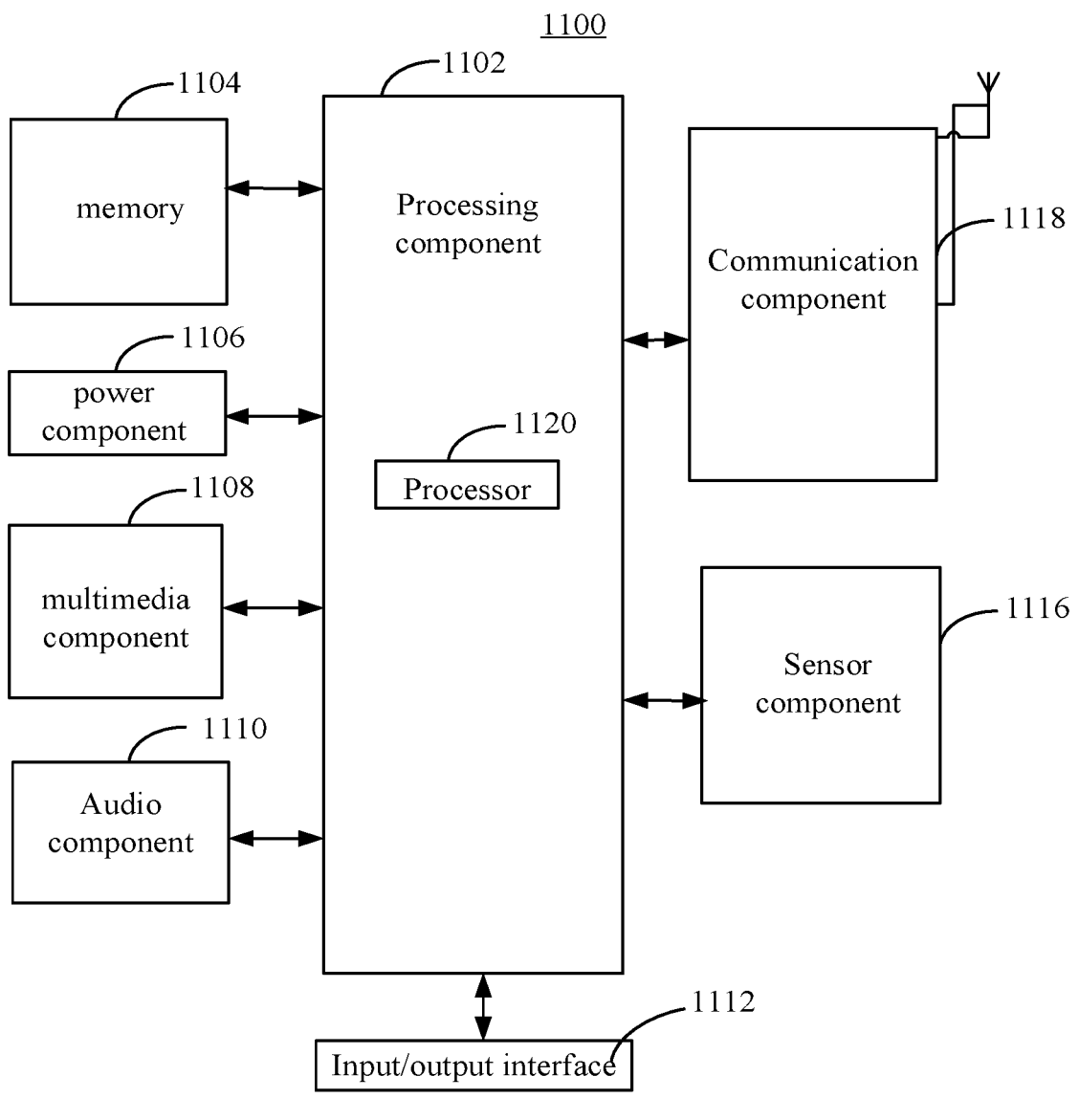
FIG. 11 is a schematic structure diagram of a wireless communication device according to an exemplary embodiment.

FIG. 11 is a block diagram of an electronic device 1100 according to an exemplary embodiment. For example, the electronic device 1100 may be a cell phone, a tablet computer, an e-book reader, a multimedia playback device, a wearable device, a vehicle terminal, an iPad, a smart TV, and other terminals.

As shown in FIG. 11, the electronic device 1100 may include one or more of the following components: a processing component 1102, a memory 1104, a power component 1106, a multimedia component 1108, an audio component 1110, an input/output (I/O) interface 1112, a sensor component 1116, and a communication component 1118.

The processing component 1102 typically controls overall operations of the electronic device 1100, such as the operations associated with display, telephone calls, data communications, camera operations, and recording operations. The processing component 1102 may include one or more processors 1120 to perform all or part of the steps in the above described method. Moreover, the processing component 1102 may include one or more modules which facilitate the interaction between the processing component 1102 and other components. For example, the processing component 1102 may include a multimedia module to facilitate the interaction between the multimedia component 1108 and the processing component 1102. For another example, the processing component 1102 may read the executable instructions from the memory to implement the steps of the wireless communication method according to the above embodiments.

The memory 1104 is configured to store various types of data to support the operation of the electronic device 1100. Examples of such data include instructions for any applications or methods operated on the electronic device 1100, contact data, phonebook data, messages, pictures, video, etc. The memory 1104 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 1106 provides power to various components of the electronic device 1100. The power component 1106 may include a power management system, one or more power sources, and any other components associated with the generation, management, and distribution of power in the electronic device 1100.

The multimedia component 1108 includes a screen providing an output interface between the electronic device 1100 and the user. In some embodiments, the multimedia component 1108 includes a front-facing camera and/or a rear-facing camera. When the electronic device 1100 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1110 is configured to output and/or input audio signals. For example, the audio component 1110 includes a microphone (MIC) configured to receive an external audio signal when the electronic device 1100 is in an operation mode, such as a call mode, a recording mode, and a voice recognition mode. The received audio signal may be further stored in the memory 1104 or transmitted via the communication component 1118. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1116 includes one or more sensors to provide status assessments of various aspects of the electronic device 1100. For instance, the sensor component 1116 may detect an open/closed status of the electronic device 1100, relative positioning of components, e.g., the display and the keypad, of the electronic device 1100, a change in position of the electronic device 1100 or a component of the electronic device 1100, a presence or absence of user contact with the electronic device 1100, an orientation or an acceleration/deceleration of the electronic device 1100, and a change in temperature of the electronic device 1100. The sensor component 1116 may include a proximity sensor configured to detect the presence of nearby objects without any physical contact. The sensor component 1116 may also include a light sensor, such as a Complementary Metal Oxide Semiconductor (CMOS) or Charge-Coupled Device (CCD) image sensor, for use in imaging applications. In some embodiments, the sensor component 1116 may also include an accelerometer sensor, a gyroscope sensor, a magnetic sensor, a pressure sensor, or a temperature sensor.

The communication component 1118 is configured to facilitate communication, wired or wirelessly, between the electronic device 1100 and other devices. The electronic device 1100 can access a wireless network based on a communication standard, such as Wi-Fi, 2G, 3G, 4G, 5G, 6G or a combination thereof. In an exemplary embodiment, the communication component 1118 receives a broadcast signal or broadcast associated information from an external broadcast management system via a broadcast channel. In an exemplary embodiment, the communication component 1118 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the electronic device 1100 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the exemplary embodiments, there is also provided a non-transitory computer readable storage medium including executable instructions, such as the memory 1104, executable by the processor 1120 in the electronic device 1100, for performing the above method. For example, the non-transitory computer-readable storage medium may be a ROM, a Random Access Memory (RAM), a CD-ROM, a magnetic tape, a floppy disc, and an optical data storage device.

Correspondingly, the disclosure also provides a wireless communication device. The device includes:

a processor.

a memory for storing computer programs; in which the processor is configured to execute the computer programs to implement the above wireless communication method applied in a base station side.

Figure 12:
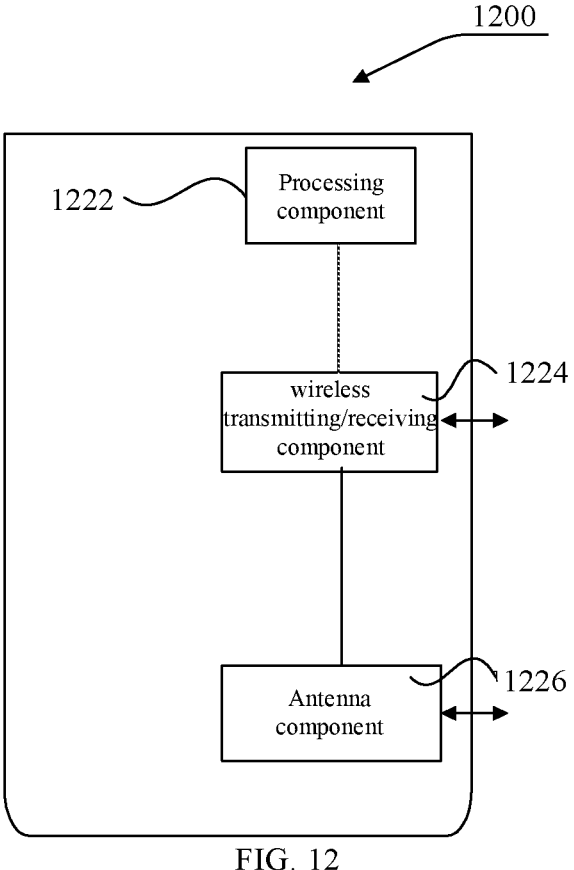
FIG. 12 is a schematic structure diagram of another wireless communication device according to an exemplary embodiment.

FIG. 12 is a schematic structure diagram of a wireless communication device 1200 according to an exemplary embodiment. The device 1200 may be provided as a base station. As shown in FIG. 12, the device 1200 includes a processing component 1222, a wireless transmitting/receiving component 1224, an antenna component 1226 and a signal processing portion for wireless interfaces. The processing component 1222 may further include one or more processors.

One of the processors in the processing component 1222 may be configured to implement the above wireless communication method applied in a base station side.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the claimed invention only be limited by the appended claims.

What is claimed is:

1. A wireless communication method, comprising:

receiving, by a user equipment, second system information carrying target indication information broadcasted by at least one base station, wherein the target indication information indicates whether the at least one base station supports multimodality, the at least one base station supports multimodality refers to the at least one base station supports at least one of: multiple types of inputs from multiple devices or a single device, or multiple types of outputs that can be distributed to multiple devices or through a single device;

sending, by the user equipment, a request message to the at least one base station after determining the at least one base station supports multimodality based on the target indication information, wherein the request message is configured to request for a multi- modal type supported by the at least one base station; wherein the multi-modal type is a type of the multiple types of inputs from the multiple devices or the single device, or is a type of the multiple types of outputs that can be distributed to the multiple devices or through the single device;

receiving, by the user equipment, third system information sent by the at least one base station based on the request message, wherein the third system information carries target information and is sent by the at least one base station via a unicast signaling or is broadcasted to the user equipment, wherein the target information indicates the multi-modal type supported by the at least one base station that supports multimodality;

determining, by the user equipment based on the target information, the multi-modal type supported by the at least one base station corresponding to the target information;

determining, by the user equipment based on the multi-modal type supported by the at least one base station, a target base station to be accessed;

in response to obtaining the target information from a plurality of base stations, determining, by the user equipment the target base station to be accessed based on the multi-modal type supported by the plurality of base stations and a second preset setting, wherein the second preset setting comprises: a matching degree between the multi-modal type supported by the plurality of base stations and a multi-modal type supported by the user equipment.

2. The method of claim 1, further comprising at least one of:

selecting, by the user equipment, a plurality of first candidate base stations with a better signal quality based on the signal qualities of the plurality of base stations measured by the user equipment, and determining, by the user equipment based on the multi-modal type supported by the plurality of first candidate base stations and the second preset setting, the target base station to be accessed;

selecting, by the user equipment, at least one second candidate base station from the plurality of base stations, the multi-modal type supported by the at least one second candidate base station includes the multi-modal type supported by the user equipment, in a case there is only one second candidate base station, directly determining the second candidate base station as the target base station to be accessed, in a case there are multiple second candidate base stations, scoring the multi-modal types supported by the multiple second candidate base stations, and determining a second candidate base station with a highest score as the target base station to be accessed; or receiving, by the user equipment, first system information broadcasted by the at least one base station, wherein the first system information carries the target information.

3. The method of claim 1, wherein the target information comprises one of: target type information for indicating at least one multi-modal type supported by the at least one base station corresponding to the target information; or target identification information corresponding to the at least one multi-modal type supported by the at least one base station corresponding to the target information; or wherein the second system information comprises a minimum SI or other SI; or wherein the third system information comprises other SI.

4. The method of claim 3, wherein determining, based on the target information, the multi-modal type supported by the at least one base station corresponding to the target information, comprises:

in response to the target information comprising the target identification information, determining, based on a target correspondence between the at least one multimodal type and the target identification information, the multi-modal type supported by the at least one base station corresponding to the target information.

5. The method of claim 4, further comprising at least one of:

receiving, by the user equipment the target correspondence configured by the at least one base station and broadcasted by the at least one base station;

receiving, by the user equipment the target correspondence configured by a core network; or determining, by the user equipment the target correspondence based on a first preset setting.

6. A non-transitory computer readable storage medium storing computer programs, wherein the computer programs are configured to implement the wireless communication method of claim 1.

7. A user equipment, comprising:

a processor;

a memory for storing computer programs; wherein the processor is configured to execute the computer programs to implement:

receiving, by the user equipment, second system information carrying target indication information broadcasted by at least one base station, wherein the target indication information indicates whether the at least one base station supports multimodality, the at least one base station supports multimodality refers to the at least one base station supports at least one of: multiple types of inputs from multiple devices or a single device, or multiple types of outputs that can be distributed to multiple devices or through a single device;

sending, by the user equipment, a request message to the at least one base station after determining the at least one base station supports multimodality, wherein the request message is configured to request for a multi-modal type supported by the at least one base station; wherein the multi-modal type is a type of the multiple types of inputs from the multiple devices or the single device, or is a type of the multiple types of outputs that can be distributed to the multiple devices or through the single device;

receiving, by the user equipment, third system information sent by the at least one base station based on the request message, wherein the third system information carries target information and is sent by the at least one base station via a unicast signaling or is broadcasted to the user equipment, wherein the target information indicates the multi-modal type supported by the at least one base station that supports multimodality;

determining, by the user equipment based on the target information, the multi-modal type supported by the at least one base station corresponding to the target information; and determining, by the user equipment based on the multi-modal type supported by the at least one base station, a target base station to be accessed;

in response to obtaining the target information from a plurality of base stations, determining, by the user equipment the target base station to be accessed based on the multi-modal type supported by the plurality of base stations and a second preset setting, wherein the second preset setting comprises: a matching degree between the multi-modal type supported by the plurality of base stations and a multi-modal type supported by the user equipment.

8. The user equipment of claim 7, wherein the processor is further configured to execute the computer programs to implement:

receiving first system information broadcasted by the at least one base station, wherein the first system information carries the target information.

9. The user equipment of claim 7, wherein the target information comprises target type information for indicating at least one multi-modal type supported by the at least one base station corresponding to the target information; or, the target information comprises target identification information corresponding to the at least one multi-modal type supported by the at least one base station corresponding to the target information.

\* \* \* \* \*